United States Patent [19]

Scheibel

[11] 4,287,162
[45] Sep. 1, 1981

[54] SEPARATION OF AMMONIA FROM AMMONIA CONTAINING GASES

[75] Inventor: Edward G. Scheibel, Media, Pa.

[73] Assignee: Suntech, Inc., Philadelphia, Pa.

[21] Appl. No.: 58,695

[22] Filed: Jul. 18, 1979

[51] Int. Cl.³ .............................................. C01C 3/00
[52] U.S. Cl. .................................... 423/238; 423/352
[58] Field of Search ............................... 423/352, 238

[56] References Cited

U.S. PATENT DOCUMENTS

| | | | |
|---|---|---|---|
| 1,559,980 | 11/1925 | Perrott et al. | 423/238 |
| 2,954,272 | 9/1960 | Schaufelberger | 423/238 |
| 3,097,065 | 7/1963 | Gollmar | 423/238 |
| 4,080,423 | 3/1978 | Smith et al. | 423/238 |

FOREIGN PATENT DOCUMENTS

| | | | |
|---|---|---|---|
| 2431531 | 1/1975 | Fed. Rep. of Germany | 423/238 |
| 6983 | of 1884 | United Kingdom | 423/238 |

OTHER PUBLICATIONS

"Baker Analyzed Reagents", J. T. Baker Chemical Co. (1961), pp. 186, 187.
Chemical Abstracts 161570m.

Primary Examiner—O. R. Vertiz
Assistant Examiner—Wayne A. Langel
Attorney, Agent, or Firm—J. Edward Hess; Donald R. Johnson; Paul Lipsitz

[57] ABSTRACT

A process for the separation and recovery of substantially pure ammonia from its admixture with gases, particularly with gases containing carbon dioxide and gases obtained from the catalytic ammoxidation of hydrocarbons to the corresponding nitriles, by scrubbing the ammonia containing gases with an aqueous solution containing a mixture of salts having different cations and the anions of one or more inorganic acids capable of absorbing and liberating ammonia; e.g., mixtures of different alkali metal salts of phosphoric, telluric, boric, vanadic, chromic, selenic, germanic, silicic and similar acids. Preferably the anion component will be at least one of phosphoric, chromic, or boric acids.

3 Claims, 1 Drawing Figure

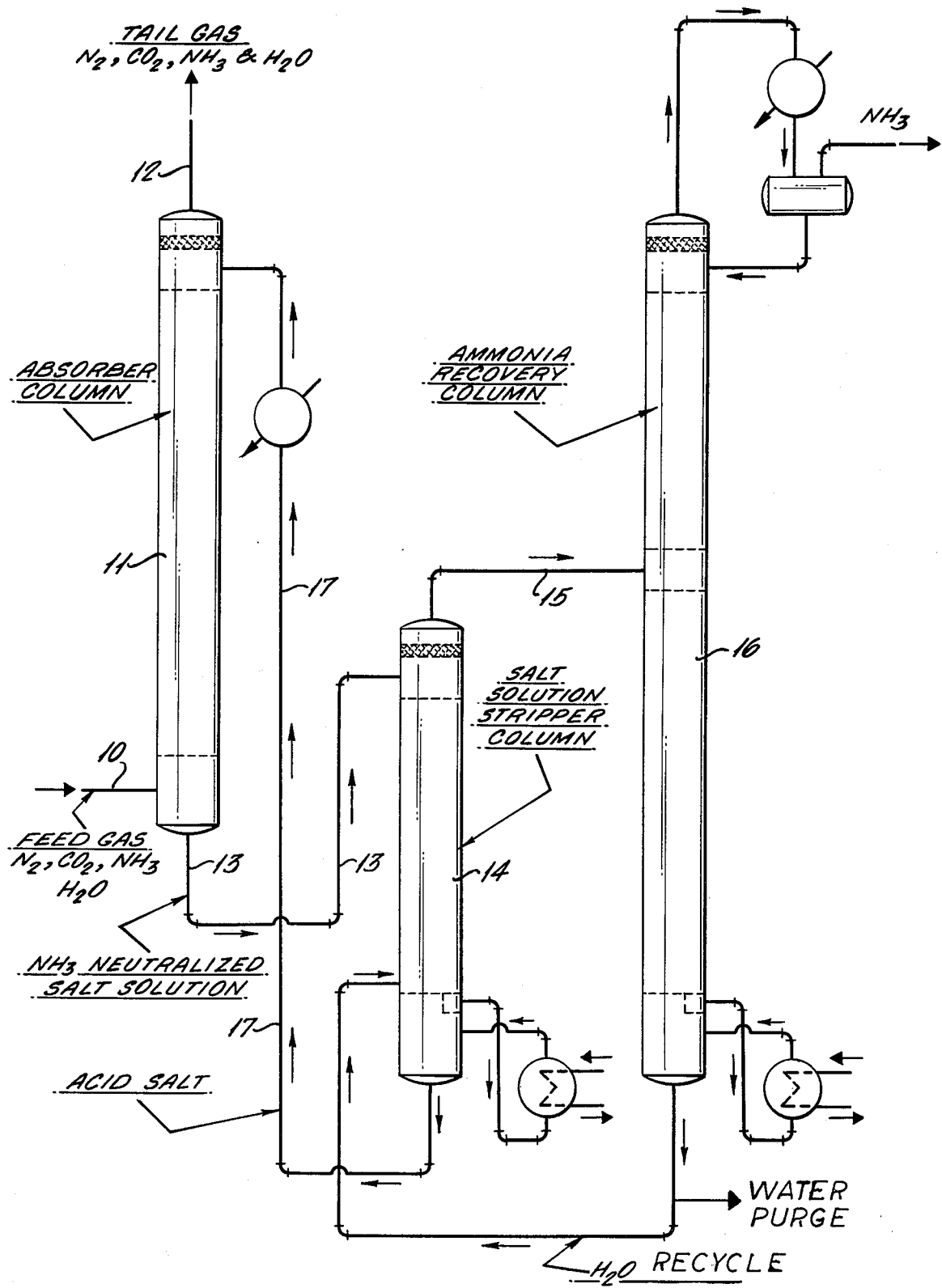

SEPARATION OF AMMONIA FROM AMMONIA CONTAINING GASES

Numerous chemical processes generate ammonia as a by-product which needs to be recovered for both economic and environmental reasons. For example, the catalytic oxidation with air of alkyl substituted organic compounds to nitriles produces a gas stream after separation of the nitrile product which contains ammonia, carbon dioxide, oxygen, nitrogen, etc. and separation of the ammonia from such a mixture is relatively difficult and expensive. It is known that various inorganic salts will absorb ammonia, either in the solid state or in aqueous solution, such salts generally providing one or more of their acidic hydrogen atoms for reaction with the ammonia.

Absorption of ammonia gas by granules of boric, chromic, arsenic, silicic, and meta-phosphoric acid is shown in U.S. Pat. No. 1,586,327. U.S. Pat. No. 1,559,980 discloses that salts of metals whose atomic weights are between 52 and 66 (Cr, Mn, Fe, Co, Ni, Cu, Zn) and also cadmium, mercury and magnesium and others which form complexes with ammonia either as ammine salts or with ammonia replacing some of the water of hydration, may be used for ammonia absorption from air in their solid states, either pure or absorbed on a suitable solid carrier. U.S. Pat. No. 3,186,795 shows phosphoric acid for ammonia separation from coke-oven gases. U.S. Pat. No. 3,149,918 also shows boric acid for recovery of ammonia from gases. Use of vanadic acid is shown by U.S. Pat. No. 1,849,420. Also of interest are U.S. Pat. Nos. 3,310,367, 3,826,815 and 4,080,423. U.S. Pat. No. 2,954,272 shows separation of ammonia from a gas containing ammonia and carbon dioxide using an aqueous solution of a metal ammine complex salt as the scrubbing agent.

It has now been found, however, that an improved process for separation of ammonia from an ammonia-containing gas is obtained by scrubbing such ammonia-containing gas with an aqueous solution containing a mixture of different cations and one or more anions of ammonia-absorbing acids. The process of the invention is particularly applicable to separation of ammonia from a gas containing an acid or an acid precursor such as carbon dioxide, which separation has heretofore presented industrial difficulties both as to operation and cost because of the formation of an ammonium salt of this acid in the aqueous absorbing liquid. It is a particular advantage of the present invention that ammonia can be substantially completely separated therefrom by the method of this invention. The removal of ammonia from its admixture with carbon dioxide, and the recovery of substantially pure ammonia gases from such mixtures therefore constitutes an important feature of the invention.

In order to separate ammonia from its admixture with other gases, particularly carbon dioxide, the scrubbing step should be carried out at a temperature that is sufficiently high to prevent substantial solution of carbon dioxide in the scrubbing liquid, and ordinarily temperatures above about 50°–60° C. will be used. The maximum scrubbing temperatures should of course be lower than those at which the salt solution begins to evolve ammonia, and should therefore not be higher than about 110°–115° C. Within these limits of about 50° to about 115° C. the optimum scrubbing temperatures will depend on the gas composition, the kind of salt used and the completeness of ammonia removal and purity of the recovered ammonia that may be desired.

In order to effectively absorb ammonia an acid should have an ionization constant equivalent to a pK value of less than 10. If the ammonia is to be liberated readily from the resulting solution the pK value of the acid must be greater than 6. Consequently any acid having at least one hydrogen ion with a pK value between these limits is theoretically suitable for the separation and recovery of ammonia from gas streams. The oxides of all atoms in groups IV, V and VI in the periodic table have hydrates with one or more hydrogen ions in this range, but most of their salts are not sufficiently soluble in water to provide a practical process. Those having the highest solubilities are the alkali metal salts of phosphoric, boric, arsenic, selenic and chromic acids, most preferably the sodium and potassium salts of phosphoric, chromic, and boric acids. By utilizing cation concentrations below the mutual solubility of the particular salts in aqueous solution, the concentration of a particular acid anion may be maximized.

It has not been recognized, heretofore, that by employing a mixture of acids for ammonia separation, ammonia absorption capacity may be maximized as described by this invention. Further, by using a high concentration of the salt mixture the water concentration in the solvent is minimized and the boiling point of the solution is raised so that recovery of the ammonia in a pure state from the salt-rich solution is facilitated.

The theoretical optimum concentration for carrying out the ammonia absorption is at the saturation point with respect to all the salts existing in solution. However, a solution of this high concentration will solidify completely if the temperature were to drop below the saturation temperature and this would require extremely precise composition and temperature control throughout the entire recovery plant. It will therefore be more practical to operate at about 80 to 90% of the saturation concentrations of the different salts in the recycle solution to provide a suitable margin for error in the instrumentation and control system of the unit.

It has also been found in a preferred embodiment of the invention that a mixed salt solution of potassium and ammonium ions containing about 10 moles of phosphate ion per liter exhibits a high viscosity so that, from the practical point of view of obtaining an efficient rate of absorption from the gas phase, it is desirable to limit the anion concentration to this value even though the saturated solution of a mixed sodium-potassium-ammonium phosphate solution can hold 20 or more percent phosphate ions. Obviously, the greater solubility for the mixed salts will provide more latitude for the control of the process in order to avoid solidification of the aqueous solution in the process lines.

The solubility of mixed salts can be compared with the solubility of the individual salts by means of the solubility product concept. The solubility product of a salt is defined as the product of the cation and anion concentrations and is normally applied to dilute mixtures where activity coefficients are equal to unity and the system is, therefore, considered ideal. The activity coefficient is, by definition, the ratio of the thermodynamic activity of a component of a mixture to its actual concentration in that mixture. For positive and negative ions, this ratio decreases with increasing concentration up to about one mole per liter and then begins to increase, so that if saturation occurs above 5 moles per liter, the activity coefficient may become greater than the limiting ratio at infinite dilution which has been defined as unity.

If the activity coefficient remains constant over a given concentration range, the system may also be considered ideal and the solubility product of a salt of univalent ions which is saturated at a concentration of one mole per liter will be 1.0 assuming complete ionization. If two different salts of the same anion have identical solubility products, it can be shown that the concentration of both salts of the anion in a solution which is mutually saturated, will be equal to $\sqrt{2}$ or 1.414 moles per liter. Consequently, if the anion reacts with ammonia, the mixed salt solution will absorb 41.4% more gas per unit volume than the saturated solution of either pure salt. Similarly, if one salt is soluble to the extent to one mole per liter and the other to 0.707 moles/liter so its solubility product is 0.5, the solution which is mutually saturated with both salts will contain $\sqrt{1.5}$ or 1.225 moles of the anion per liter. This is 22.5 greater than the solubility of the more soluble salt and the solution will, therefore, absorb 22.5 more ammonia than the saturated solution of the more soluble salt alone.

Similarly, when more than two cations are involved, the mutually saturated solution will contain a concentration of the mutual anions equal to the square root of the sum of the solubility products of all the different salts of this anion.

It will be understood that if activity coefficients are lower in the mutually saturated solution, the salt concentrations will be greater, and conversely if the activity coefficients increase in the mutually saturated solution, the salt concentrations will be less than calculated from the ideal solution concept. But under all circumstances, the combined solubility will be greater than the solubility of the most soluble pure salt.

As indicated, the preferred salts used in the process of the invention are the mixed alkali metal salts of phosphoric, chromic, or boric acids. It is also desirable to use a mixture of these (and/or the other acids set forth above), but most preferably for economic reasons a mixture of phosphates and borates will be used. With mixed anions, as well as mixed cations, at a given temperature the relationships of the solubility products at mutual saturation of all possible salts will be more complex, but, for each additional salt, the total anion concentration will be greater than that of the maximum possible concentration obtainable with the original mixture. If all anions are capable of absorbing ammonia, such a mixture will provide the maximum solubility for ammonia separation and recovery. It will have the highest boiling point due to the low water concentration, and this is advantageous in recovering an anhydrous ammonia product because of the strong dehydrating effect of the dissolved salts. And, as previously noted, the salt concentration in all cases will be limited primarily by the physical properties of the salt solution, particularly viscosity.

At 25° C., the maximum phosphate ion concentration obtainable with pure salts is 8 moles/liter with both $K_3PO_4$ and $NaH_2PO_4$. The mixed salt $Na(NH_4)HPO_4$ is soluble only to 0.8 moles/liter at this temperature so the concentration of sodium ions at mutual saturation will be limited. The $KH_2PO_4$ salt is also soluble to only 1.8 moles per liter. By using a mixture of salts with different cations, in accord with the invention, greater solubility of the salts and greater ammonia absorption capacity is obtained.

Reference is now made to the drawing which illustrates a typical commercial operation of the process of the invention. The ammonia containing gas is fed through line 10 to an absorber column 11 containing the mixed aqueous solution of salts. The process feed gas stream shown in the drawing is a typical off-gas from the catalytic ammoxidation of an alkyl aromatic hydrocarbon (e.g. p-xylene) to give the nitrile (e.g. terephthalonitrile) and contains $N_2$, $CO_2$, $NH_3$ and $H_2O$. As the acid salt solution is fed down absorber column 11 much of the ammonia is extracted and the tail gas of $N_2$, $CO_2$, $H_2O$ and which is essentially free of $NH_3$ leaves the column by line 12 at the top. The ammonia neutralized salt solution exiting the bottom of the column through line 13 is fed into the top section of a salt solution stripping column 14 from which ammonia is distilled off and the ammonia stream passes through line 15 to the central portion of the ammonia recovery column 16 from which the ammonia is distilled off to compression and/or storage or use. The mixed acid salt solution remaining in stripper 14 is withdrawn from the bottom of column 14 through line 17 and recycled, with make up as needed (not shown), to the top of absorber column 11. The water absorbed from the feed gas by the salt solution is purged from the bottom of the ammonia recovery column 16. The excess water in the vapor stream of line 15 is recovered from the water stream at the bottom of column 16 and is recycled to the salt solution stripper column 14, preferably into the bottom portion of the column through line 18 to maintain the salt solution below the saturation temperature when it is cooled for recycle to the absorber column 11. If the temperature coefficient of the salt solubility is small it will be necessary to recycle this excess water removed in the vapor stream in line 15 to the top of column 14 to prevent crystalization in this column. This latter modification, show on the drawing in dashed lines as set out above, becomes more critical when the absorption process is operated closer to the saturation concentration of the salt solution.

In order to further describe and illustrate the invention the following examples are given:

EXAMPLE 1

A gas consisting of 350 gms of nitrogen, 34 gms of ammonia, and 10 gms of $CO_2$ is bubbled through a single-stage absorption flask in which an aqueous solution containing 4 moles of phosphate ion, 6 moles of potassium ion and 3.53 moles of $NH_3$ is circulated at 0.982 liters/hour. The rich liquor from the absorber contains 4.60 moles of $NH_3$ per liter and is circulated through an evaporator to remove the dissolved $NH_3$ and the remaining liquor is continuously recycled to the absorber. The vapors from the evaporator are cooled to room temperature and the condensate refluxed to the evaporator. The noncondensible vapors from the evaporator contain 0.003 mole fraction $N_2$, 0.002 mole fraction $CO_2$, 0.012 mole fraction water and the balance of 0.983 mole fraction was $NH_3$.

EXAMPLE 2

The same flow rates as in Example 1 are used with a solution containing 4 moles of phosphate, 8 moles of potassium ion, and 3.59 moles $NH_3$, and the rich liquor from the absorber contained 4.65 moles of $NH_3$. This liquor is evaporated and the liquid condensate is refluxed to the evaporator. The product gas contains 0.0006 mole fraction nitrogen, 0.0005 mole fraction $CO_2$, 0.0055 mole fraction $H_2O$ and the balance of 0.9934 mole fraction was $NH_3$.

EXAMPLE 3

The mutual solubility of the potassium ammonium phosphate system is illustrated by a mixture of 5 moles of $KH_2PO_4$, and 5 moles of $K_2HPO_4$ in one liter of water which is partially neutralized with 10 moles of $NH_3$. The dissolved salt corresponds to 10 moles of $K_{1.5}(NH_4)_{0.5}PO_4$ in a liter of water and this solution crystallizes at 24° C.

Thus it is seen that by use of a salt mixture of two cations (potassium and ammonium) the ammonia absorbing capacity of the solution is increased more than twice that using a single salt such as $(NH_4)_2HPO_4$ which is soluble in water to only 4.7 moles per liter at 25° C.

Similarly when a mixture of $NaH_2PO_4$ is used for the $KH_2PO_4$ of Example 3, the resulting solution of mixed cations enables a still higher amount of ammonia to be absorbed (about 20% more) without encountering crystallization at the same temperature.

It will also be understood from the above discussion that an ammonia absorbing solution where more than three different cations are present is even more effective in ammonia absorption, but the complexities of the system increase also and may lead to inefficiencies in commercial operation due to high liquid viscosities.

The invention claimed is:

1. A process for the recovery of ammonia from its admixture with gases which comprises scrubbing said ammonia containing gas at a temperature between about 50° to about 115° C. with an aqueous solution containing a mixture of different cations selected from the group consisting of ammonia and alkali metal cations and a mixture of anions of phosphate and borate, wherein said anions are at a concentration of from about 80% to about 90% of saturation concentration.

2. The process of claim 1 wherein the ammonia-containing gas contains carbon dioxide.

3. The process of claim 1 wherein the ammonia-containing gas is obtained from a catalytic ammoxidation process.

* * * * *